United States Patent [19]

Carrubba et al.

[11] Patent Number: 4,719,568
[45] Date of Patent: Jan. 12, 1988

[54] HIERARCHICAL MEMORY SYSTEM INCLUDING SEPARATE CACHE MEMORIES FOR STORING DATA AND INSTRUCTIONS

[75] Inventors: Francis P. Carrubba, Sunnyvale, Calif.; John Cocke, Austin, Tex.; Norman H. Kreitzer, Yorktown Heights, N.Y.

[73] Assignee: International Business Machines Corporation, Armonk, N.Y.

[21] Appl. No.: 862,348
[22] PCT Filed: Dec. 30, 1982
[86] PCT No.: PCT/US82/01829
§ 371 Date: Sep. 19, 1983
§ 102(e) Date: Sep. 19, 1983
[87] PCT Pub. No.: WO84/02799
PCT Pub. Date: Jul. 19, 1984

[51] Int. Cl.⁴ .................. G06F 12/00; G06F 9/38; G06F 13/00
[52] U.S. Cl. ............................................. 364/200
[58] Field of Search ... 364/200 MS File, 900 MS File

[56] References Cited
U.S. PATENT DOCUMENTS

| | | | |
|---|---|---|---|
| 3,618,041 | 11/1971 | Horikoshi | 364/200 |
| 4,268,907 | 5/1981 | Porter et al. | 364/200 |
| 4,467,414 | 8/1984 | Akagi et al. | 364/200 |
| 4,472,774 | 9/1984 | Pilat et al. | 364/200 |
| 4,481,573 | 11/1984 | Fukunaga et al. | 364/200 |
| 4,502,110 | 2/1985 | Saito | 364/200 |
| 4,521,851 | 6/1985 | Trubisky et al. | 364/200 |
| 4,527,238 | 7/1985 | Ryan et al. | 364/200 |
| 4,530,050 | 7/1985 | Fukunaga et al. | 364/200 |
| 4,597,044 | 6/1986 | Circello | 364/200 |
| 4,612,612 | 9/1986 | Woffinden et al. | 364/200 |

Primary Examiner—Emanuel S. Kemeny
Assistant Examiner—Randy W. Lacasse
Attorney, Agent, or Firm—Roy R. Schlemmer

[57] ABSTRACT

A hierarchical memory system for use with a high speed data processor characterized by having separate dedicated cache memories for storing data and instructions and further characterized by each cache having a unique cache directory containing a plurality of control bits for assisting line replacement within the individual cache memories and for eliminating many accesses to main memory and to insure that unnecessary or incorrect data is never stored back into said main memory.

The present cache architecture and control features render broadcasting between the data cache and instruction cache unnecessary. Modification of the instruction cache is not permitted. Accordingly, control bits indicating a modification in the cache directory for the instruction cache are not necessary and similarly it is never necessary to store instruction cache lines back into main memory since their modification is not permitted.

The cache architecture and controls permit normal instruction and data cache fetches and data cache stores. Additionally, special instructions are provided for setting the special control bits provided in both the instruction and data cache directories, independently of actual memory accessing OPS by the CPU and for storing and loading cache lines independently of memory OPS by the CPU.

16 Claims, 20 Drawing Figures

STORAGE HIERARCHY

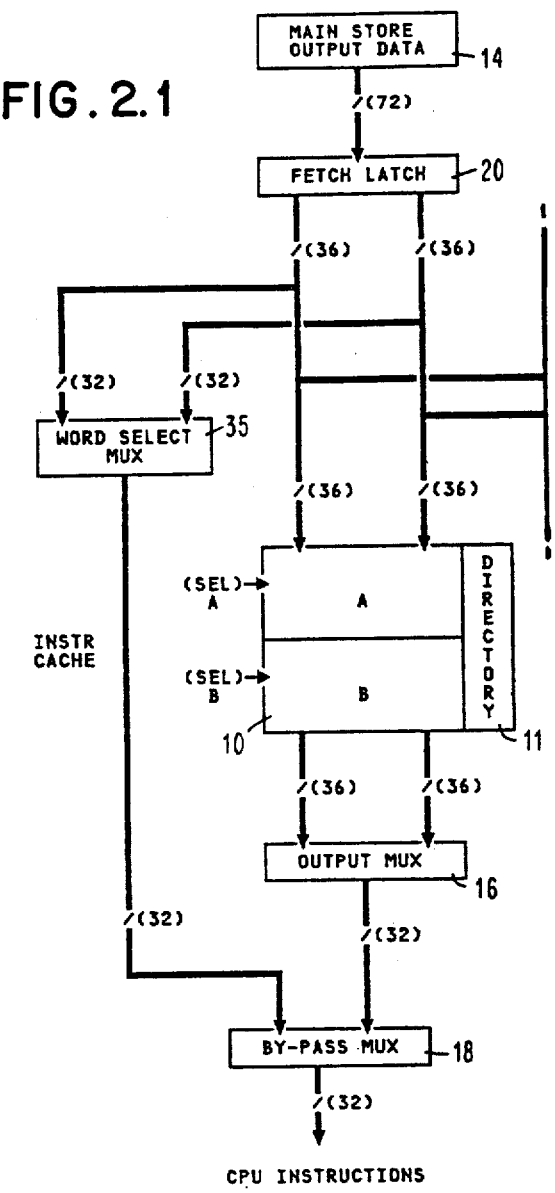
FIG. 2.1

FIG. 2.2
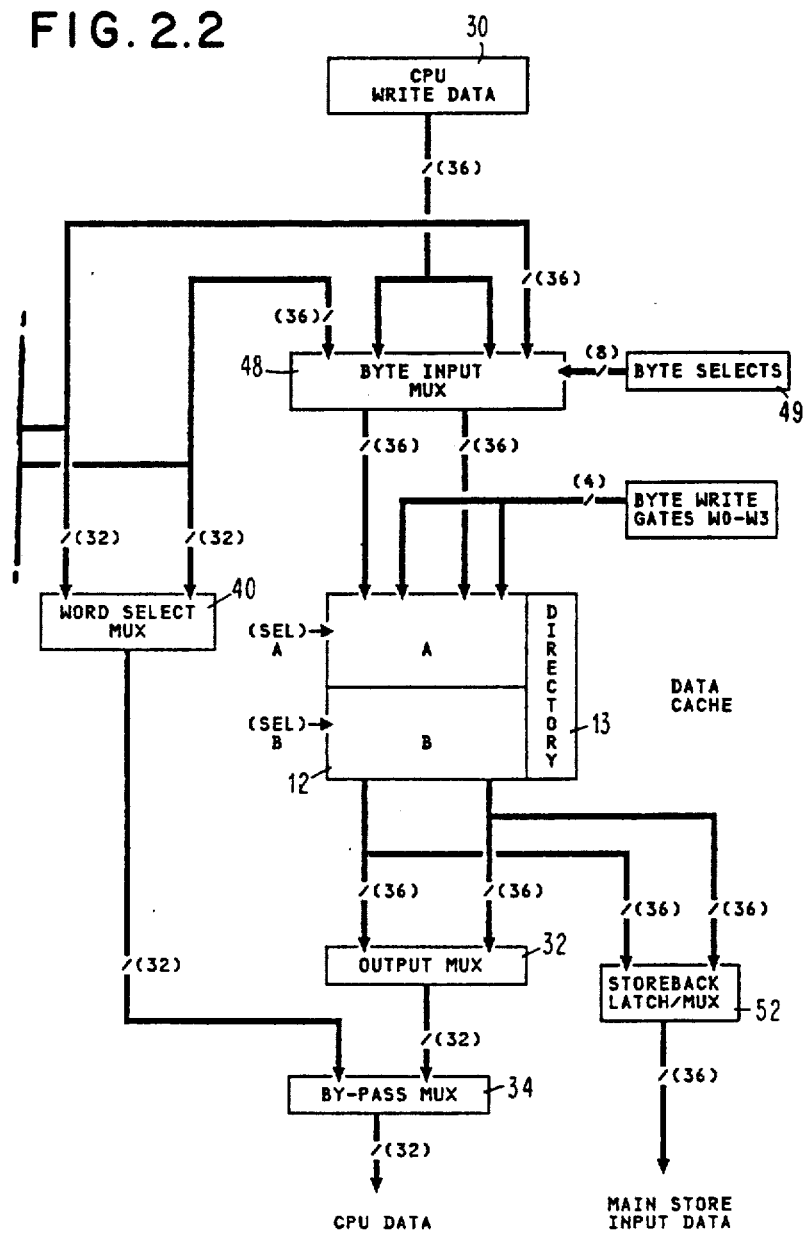

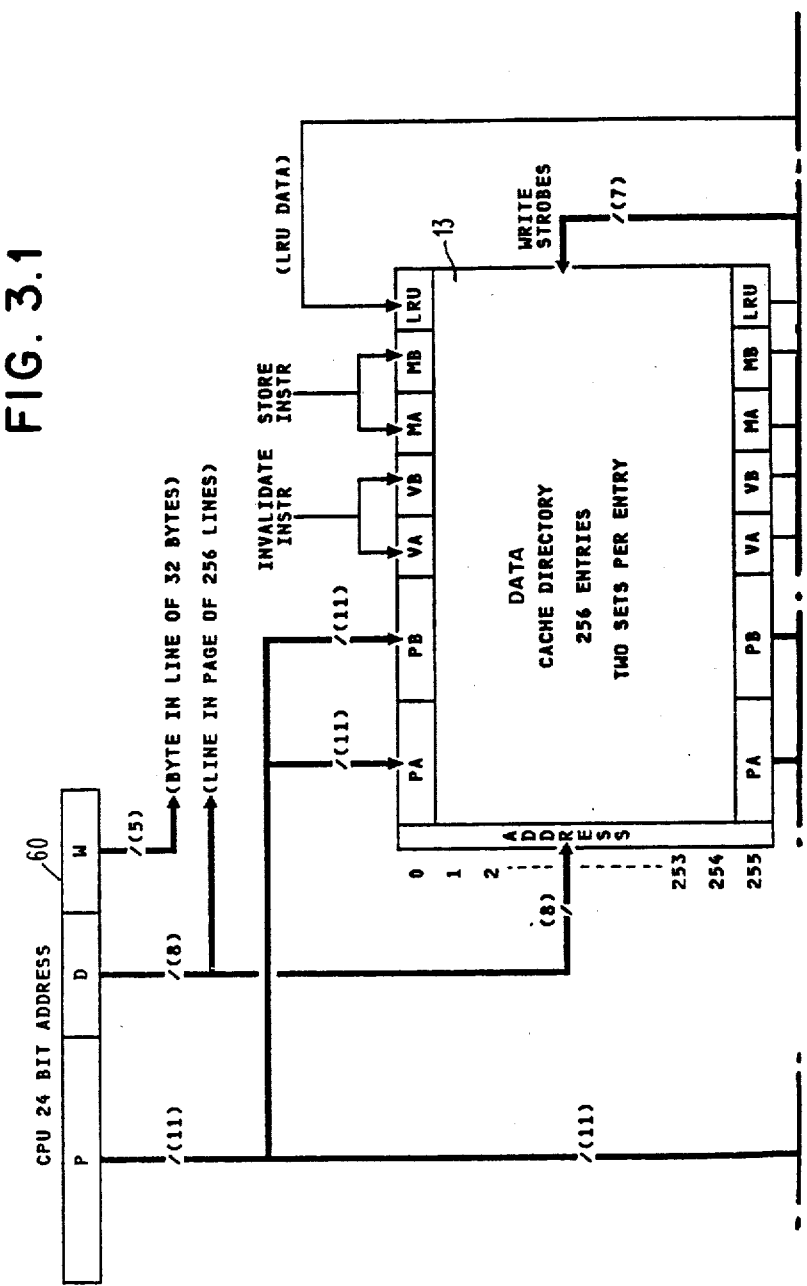
FIG. 3.1

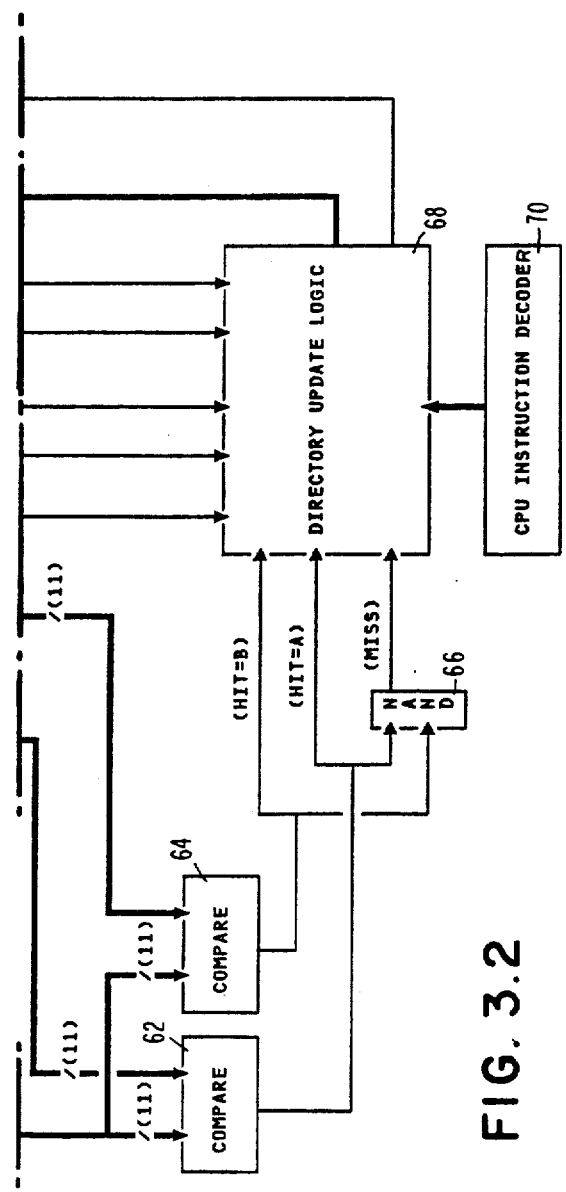
FIG. 3.2

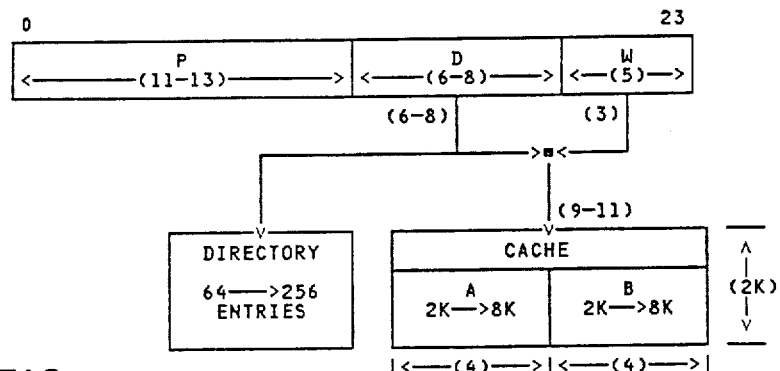

FIG. 4

| P FIELD BITS | D FIELD BITS | CACHE SIZE (BYTES) | DIRECTORY WORDS | TOTAL CACHE LINES |
|---|---|---|---|---|
| 13 | 6 | 4K | 64 | 128 |
| 12 | 7 | 8K | 128 | 256 |
| 11 | 8 | 16K | 256 | 512 |

(one line = 32 bytes)

DIRECTORY ENTRIES:

| Pa | Pb | Va | Vb | Ma | Mb | LRU |
|---|---|---|---|---|---|---|

Va and Vb are valid[1] bits
Ma and Mb are modified[2] bits
LRU is the least recently used subset bit[3]

---

(1) If Cache contains most recent version of Main Store data, V=1.

(2) If the data cache has been modified and the line has not been stored back to Main Store, M=1. (not used in instruction cache)

(3) If LRU bit = 1, LRU subset is A. If bit = 0, subset is B.

CACHE ADDRESSING AND SIZE CONTROL

Load Data Cache Line Hardware Procedure

Set Data Cache Line Hardware Procedure

Store Data Cache Line Hardware Procedure

INVALIDATE CACHE LINE

INSTRUCTION CACHE FETCH

DATA CACHE FETCH

DATA CACHE STORE (1) Store Pt on miss only.

LOAD DATA CACHE LINE

HIERARCHICAL MEMORY SYSTEM INCLUDING SEPARATE CACHE MEMORIES FOR STORING DATA AND INSTRUCTIONS

TECHNICAL FIELD

The present invention relates to a hierarchical memory organization utilizing a unique cache architecture having separate caches for storing instructions and data. The hierarchical memory organization is particularly adapted for use with very high speed modern electronic computing systems where it is specifically desired to eliminate or minimize time lost by CPU while waiting for data to be accessed from or stored into the memory.

BACKGROUND ART

Modern high speed electronic data processing systems often comprise a processor or CPU and a hierarchical memory system including a high capacity relatively low speed memory whose cycle time is much less than the cycle time of the processor and a relatively low capacity high speed memory, conventionally known as a cache, which has a memory cycle time comparable to the cycle time of the processor. Such cache memory systems are well known in the art for reducing effective memory access time at a more or less reasonable cost. When information is required by the CPU, it is read from the main memory, provided to the processor and written into the cache memory. If the same information is required subsequently by the processor, it may be read directly from the cache memory to avoid the time delay which would normally be encountered when reading the main memory.

However, if the cache memory is filled, the required information must be obtained from the main memory and the storage location in the cache memory must be identified for storing this new information. However, before the old location can be used for storing the new data, a determination must be made to see if the data currently in the cache has been modified by the program and if so, it must be stored back into the main memory in order that the main memory will properly reflect the current state of the data (if required). Most current cache architectures require such store back however it would obviously be advantageous to delete this store back function if the data in its modified form, will not again be needed by the program or if the data were never modified.

Another common feature present in most existing cache architectures is that they are essentially transparent to the system software. That is, the system software including compilers, operating systems etc. utilize memory fetch and store operations as though the cache did not exist. In such systems the hardware of the cache in essence interposes itself between the CPU and the main memory. In such system the existence of the cache greatly speed up effective memory access time however many of the benefits which could be derived from such a high speed storage are lost due to the architectures and conventions used.

An article entitled "The 801 Minicomputer," by George Radin, published in the ACM SIGPLAN Notices, Vol. 17, No. 4, April 1982, pages 39-47, is an overview of an experimental minicomputer which incorporates a hierarchical memory organization including separate cache memories for instructions and data including the teachings of the present invention.

U.S. Pat. No. 4,142,234 assigned to the same assignee as the present invention; an article entitled "Cache Memory with Prefetching Data Priority," by B. Bennett et al in the IBM Technical Disclosure Bulletin, Vol. 18, No. 12, May 1976; and U.S. Pat. No. 4,056,844 all generally disclose hierarchical memory organizations including cache memories wherein the cache memories are neither subdivided into separate data and instruction sections nor do they contain special control fields accessible to the program for controlling the operation of the memory system.

U.S. Pat. No. 4,161,024 and U.S. Pat. No. 4,195,342 both describe EDP systems which include direct CPU to cache interfaces as are generally known in the art.

U.S. Pat. No. 4,070,706 discloses a cache memory system in which the cache is divided into a data section and an address section (not a directory) but not into data and instruction sections.

U.S. Pat. No. 4,245,304 described a split cache system which divides the operation into two half cycles which enables the accessing of instructions from the cache or writing data into the cache during the same half cycle. This patent neither discloses nor suggests special control bits in the cache directory for controlling cache/main memory operations.

U.S. Pat. No. 4,075,686 describes a cache storage system which selectively bypasses the cache in accordance with the coding of a particular instruction bit in a memory access operation thereby shortening execution time for certain types of operations.

U.S. Pat. No. 4,142,234 discloses a cache system which eliminates particular interrogations of the cache directory to reduce the size of the spec.

U.S. Pat. No. 3,618,041 and an article entitled "Split Cache with Variable Interleave Boundary," by G. C. Driscoll et al in the IBM Technical Disclosure Bulletin, Vol, 22, No. 11, April 1980, page 5183, both broadly disclose the basic concept of splitting a cache subsystem into separate instruction and data sections and providing complex operating system support for the overlapped operation of the two separate caches.

U.S. Pat. No. 4,197,580 broadly discloses a single cache subsystem which utilizes a special validity bit and a "tag" which is used to control certain read-write operations. This bit is used to avoid unnecessary cache cycles rather than main memory cycles which latter result is the intent of the present invention.

SUMMARY AND OBJECTS

It is a primary object of the present invention to provide an improved hierarchical memory organization comprising a large main store and a significantly smaller cache memory subdivided into two separate sections devoted exclusively to the storing of data and instructions respectively.

It is another object to provide such a cache memory organization having at least one special control bit in the cache directory for each line of which influence the operation of the cache.

It is another object of the invention to provide such a cache memory having at least one special control bit which is utilized in the cache line replacement process.

It is another object to provide such a cache memory system wherein a control bit indicates whether the line in the data cache has been modified since originally being stored there.

It is another object of the invention to provide a control bit indicating whether a given cache line is valid.

It is another object to provide such a cache subsystem wherein temporary data storage space may be provided for scratch pad memory and the like without necessitating any referrals to main storage.

It is another object of the invention to provide such a cache subsystem wherein all mass control is controlled by the system software and no controls are necessary for informing the instruction cache when changes have been made to data stored in the data cache.

Other objects, features and advantages of the invention will be apparent to those skilled in the art from the following detailed description of the preferred embodiment of the invention.

The objects of the present invention are accomplished in general by a hierarchical memory system for use with a high speed data processor including a large relatively slow main memory and a much smaller high speed cache memory. The cache memory comprises two separate sections dedicated for storing data and instructions respectively. Each section is provided with a unique cache directory having a storage location for every line stored in said cache. Each said storage location in both directories includes means for storing the higher order bits of the main memory address of the data stored in the respective cache line and for storing special control bits settable by the system for controlling the operation of said cache memory whenever a memory access to the particular line is requested. Both said cache directories contain a control bit in each directory entry for indicating which one of a plurality of cache subset lines is to be replaced in the event of a cache MISS. Both of said directories also contain a plurality of control bits in each storage location for indicating that predetermined cache lines pointed to by the particular cache directory storage locations are invalid. Each storage location in said cache directory for the data cache also has a plurality of bits for indicating that the predetermined cache line pointed to by the particular address stored in the storage location has been modified by a previous CPU operation and that the corresponding line in main storage must be updated via a 'store back' operation before the particular line in the cache can be replaced.

Means are also provided in the cache control system for setting various control bits in the cache directories and for loading and storing specified cache lines from the main memory and vice versa independently of memory access operations emanating from the CPU.

BRIEF DESCRIPTION OF THE DRAWINGS

FIGS. 2.1 and 2.2 comprise a functional block diagram of the storage hierarchy set forth in FIG. 1 showing details of the data flow and functional hardware organization.

FIGS. 3.1 and 3.2 comprise a functional block diagram of the details of the data cache addressing showing the essential elements of the cache directory and its associated control elements.

FIG. 4 comprises a tabular description and summary of the cache addressing, the directory entries and the cache parameters for three different cache sizes (4K, 8K and 16K).

DESCRIPTION OF THE PREFERRED EMBODIMENT

General Description of the Storage Hierarchy

Figure 1:
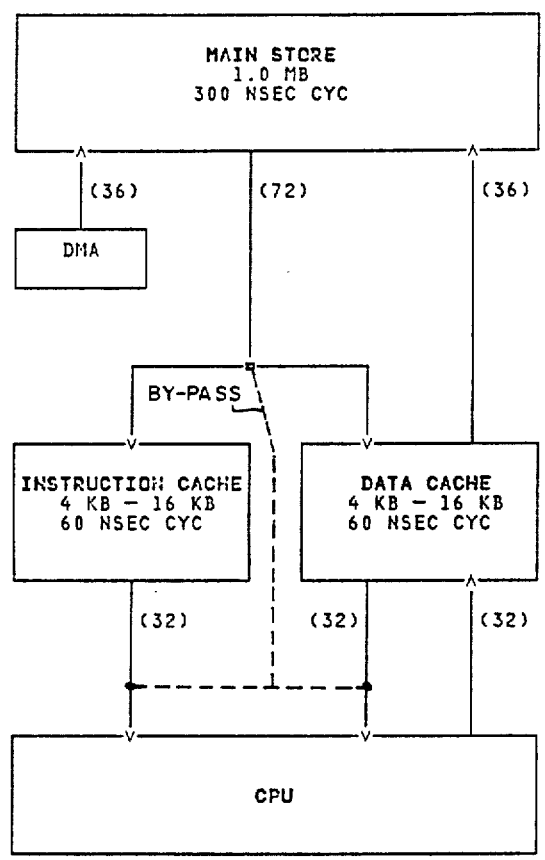
FIG. 1 comprises a high level organizational diagram of the present hierarchical memory organization.

The performance of systems (CPUs) which are extremely fast operating out of the cache is heavily dependent on the storage subsystem performance. Present technologies permit the production of caches having 60 nanosecond access times and backing stores bring access times about 1/5 as fast or approximately 300 nanoseconds. Improvements in the storage subsystem performance have very good payoffs in terms of total system performance.

The present invention is directed towards improving cache subsystem performance in two areas of operation. The first is improving the cache hit ratio or increasing the percentage of storage references which are found in the cache and consequently do not require access to main store and its attended delay. Second is improving the time to access a line from backing store when a cache reference misses.

Considering the first objective it may be observed that quite often accesses to the backing store are unnecessary for correct execution. They occur because the hardware cannot guess the intent of the software. Generally, this unnecessary reference to bakcing store falls into two classes.

The first is that the program wants a block of new store. This can occur when a procedure is called and needs temporary (i.e. AUTOMATIC) storage, when a First Level Interrupt Handler needs a register save area, or when an Access Method needs a buffer, when a program issues a GETMAIN request, etc. What is similar about all of these cases is that the program does not care about the old contents of the storage, it just wants some space. However, the majority of current storage subsystems will on first reference to such storage, fetch the old line from the backing store to cache. It will do this because the first reference will be at most, to one word in the line (since that is the unit of access between the CPU and the cache) and the subsystem cannot tell that subsequent requests will ask for other words in the line before they are newly updated.

The second case is that the program no longer needs the block of storage, even though its contents have been modified. This can occur on return from a procedure when the temporary storage is freed, when a buffer is freed, generally when a program issues FREE MAIN, etc. No currently available storage subsystems are known to exist in the art which have the facilities for determining that such store-backs of modified lines are not necessary.

The value of present invention is contingent upon a CPU which will provide hardware primitives (in the form of instructions) by which software can give such information to the hardware and thus to the cache control mechanisms. Particularly, two instructions are defined for execution by the present cache control hardware which generally allow such software control of the cache operations.

They are defined as:
(1) SET DATA CACHE LINE and
(2) INVALIDATE DATA CACHE LINE

These instructions are issued by the control program, and generated by the compiler for application programs. These instructions then ensure that such unnecessary backing store accesses are not made. In fact, since the temporary storage needed by a procedure is managed in a stack and since even supervisor calls are CALLED as requied, the backing store will not be accessed for a dispatched processes data unless this data is persistent (i.e., STATIC) or the stack depth gets large compared to the cache size. Thus the backing store begins to play a role which is similar to that played by secondary storage (i.e., a file space and a paging area). With such a strategy, the CPU activity on interrupt is no more than that performed by "priority level interrupt" systems at the their high end. They also must store their internal registers in high speed memory (i.e. registers space). The difference in the previously described CPU organization is that it does not dedicate high speed memory for this purpose and is thus able to save cost. Such an architectured CPU may find a cache miss on 'redispatch', but that is not in the response-critical part of the path.

The CPU, as in most systems, is fetching instructions from cache in anticipation of their execution. It has a "prefetch buffer" (in the presently disclosed system a buffer of three words is assumed) which it attempts to keep filled. Sometimes filling this buffer results in a cache miss and this initiates a fetch from the backing store. But it may be that the isntructions being fetched follow a branch instruction which is already in the buffer but not yet executed. In the present architecture it is assumed that the CPU prefetch mechanism scans op codes and inhibits such unnecessary backing store fetches. In fact, while scanning op codes for this purpose it is also able to recognize and eliminate NO OP'S, which thus take zero execution time.

The second way of improving the storage subsystem performance in accordance with the teachings of the present invention involves making the backing store access faster.

When a word is required from the storage subsystem, whether data or instruction, which results in a cache miss, the backing store is accessed for the required line beginning with the needed word. This word is then sent directly to the CPU, bypassing the cache, and the CPU continues execution while the line is being stored into the cache. Thus, for instance, to complete load instruction which results in a cache miss may take as little as 340 nanoseconds (minus whatever instructions can be overlapped with the load).

Because it has been found that the instruction prefetch mechanism is essentially asynchronous with respect to the data fetch mechanism it has been found advantageous to split the cache into two separate sections, one for instructions the other for data. This results in an ability to access the backing store by each cache independently and in an overlapped manner. This feature when the particular instruction stream being executed permits, can, in effect, double the access speed. There are other advantages possible with such an overall cache subsystem architecture.

The present cache subsystem is so architected and defined that modification of an instruction in the instruction cache is not permitted. Therefore fetching an instruction line will never require store back and attend out delay on an instruction cache MISS.

Each cache portion (instruction and data) is designed to be two-way set associative. Thus some of the benefits of four-way set associativity can be obtained without the cost. A special control bit or field referred to hereinafter as the LRU bit (least recently used) allows the present two-way set associative cache to have a regular replacement procedure which determines which of the two lines at the addressed area of the cache is to be replaced after a miss.

Separate cache characteristics such as overall size, depth, line size and other physical parameters may be chosen to suit the individual caches to the particular purpose for which they are intended i.e., instructions or data. Similarly separate replacement algorithms can be employed, taking advantage of different access characteristics or patterns of instructions versus data. In a prototype of the present system similar replacement algorithms were utilized for both caches with satisfactory results however it was noted that certain improvements would have accrued from tailoring the algorithms to the particular cache.

As stated previously in the "prior art" section, split caches have been known in the art for a number of years however their implementation with conventional architectures, has caused serious problems. Since instructions can legally be modified in the data cache, and then be branched to, all modifications must be broadcast to the instruction cache, and it must insure that it invalidates any modified line. But in fact, instructions are almost never modified in today's more sophisticated systems. It was accordingly determined that this function i.e., the modification of instructions was one which could be performed much more efficiently in software (whenever necessary) than by providing a mechanism for performing this function repeatedly, on every data modification, in hardware.

As stated previously in the present system, it is assumed that software is provided for placing an instruction in the data cache and treating it as data when modification is necessary. As will be apparent this may be effected easily. However, the data cache does not broadcast changed lines to the instruction cache. Thus, these changes will not be reflected in the next branch to the modified instruction. To accomplish such control, the herein disclosed split cache subsystem architecture provides an instruction called

INVALIDATE INSTRUCTION CACHE LINE which software must issue to flush out the old instruction, and another instruction called

STORE DATA CACHE LINE which is used to ensure that the modified instruction is reflected into the backing store. When program modification occurs because of a load from disk, by far the most common case, only the first instruction must be issued.

An additional advantage of the present cache subsystem architecture is that, because of the split and independently operating caches, it is possible to naturally support separate virtual memories for instructions and data. This allows software strategies in which a single reentrant copy of, for example an APL INTERPRETER, can execute for many different user areas with a minimum of bus time with recurrent memory operations.

The architecture does not allow shared pages between virtual memories. This restriction provides significant simplifications from both the hardware and softward standpoint. Primarily it allows the caches to be operated in the virtual mode. In other words the cache may be accessed with a virtual rather than a real address. As is apparent, this results in absolutely no lost time or degradation due to performing a relocate algorithm when the line is found in the cache (over 90% of the time).

Conventional relocate systems dedicate significant amounts of high speed storage for look aside tables (DLAT'S) or Page Tables. The storage is generally the same technology as a cache and is accordingly quite expensive. In the present architecture Page Tables may be accessed normally through the cache and due to their expected high frequency of use generally result in a very high probability of a cache hit. Thus, with no additional cost, it is possible to approximate the performance DLAT'S. Thus, a normal investment in DLAT'S may either be appropriately diverted to increasing the size of the cache or deleted altogether without in any way significantly effecting system performance.

Before proceeding with a detailed description of the hardware embodiment, the special hardware instructions provided therefore and the various operations performable within the present cache subsystem there will follow a brief description of the Figures and how they relate to each other.

FIG. 1 is an overall organizational diagram of the hierarchical memory organization clearly showing the relationship between the CPU, the instruction cache, the data cache and the main store. A direct memory adaptor (DMA) is also shown as being directly connected to the Main Store. As stated previously in most cache based systems I/O would proceed through the cache subsystem in order to be stored in main store with the attendant degradation in system throughput. In the present system I/O is prohibited from going through the cache and in fact most go through the DMA directly. In fact, as will be described later, provision is made for preventing an I/O operation from interrupting a cache initiated store and read which would be occasioned by cache miss "with store through" type of operation. It will also be noted in referring to the Figure that there is a data flow line from the data cache to the main store whereas none exist from the instruction cache to the main store. This will be remembered because instruction modification is not permitted in the instruction cache, hence no need exists for "store through" for this portion of the cache.

FIG. 2 (2.1 and 2.2) comprises an expansion of FIG. 1 illustrating the data paths between the main store, caches and CPU in greater detail. The multiplexers (MUX) shown are conventional logic circuits which perform gating functions for the various types of data transfer that have been provided in this hardware embodiment. Note that one parity bit per byte of data is carried through the I/O, the main store and both caches, but parity bits are not transmitted to or received from the CPU.

FIG. 2 illustrates the word by-pass mechanism which provides a direct data path for the 4 byte target data word from the main store to the CPU. The basic size of data transfer between the caches and the main store is a line of 32 bytes. This data is received from the main store as a series of 4 double words of 8 bytes and each and the storage architecture insures that the first double word received will always contain the target word, which is by-passes to the CPU simultaneous with its storage in the cache. Note that a path for storage of data from the cache back to the main store is provided for the data cache only, as a series of 8 words of 4 bytes each via the storeback multiplexer.

Referring to the instruction cache and the data cache, respectively in FIG. 2, it will be noted that the existence of two subsets A and B is shown. As described previously, the existence of the two subsets is a requirement of the two-way set associativity of the addressing architecture.

A brief description of the data flow diagram of FIG. 2 will now follow. Referring to the figure, the data flow is essentially from the top to the bottom of the figure. The instruction cache 10 and the data cache 12 may both receive data from the main store 14. However, only the data cache may receive data from the CPU. This was described previously. This is because the present architecture allows no modification of instructions in the instruction cache and accordingly the output of the instruction cache only goes to the CPU. Similarly, since instructions in the cache may not be modified by the CPU directly, it is only necessary that the instruction cache be connected to the main store 14 for loading purposes via fetch latch 20 and input multiplexor 22. Thus, to store an instruction in the instruction cache 10 a line of instruction data is caused to be transferred through the fetch latch 20, and finally into the selected section (line) of the instruction cache. Similarly, to transfer an instruction from the instruction cache into the CPU a word of data is read out from the selected section of the instruction cache to the output multiplexor 16 and the bypass multiplexor 18.

The associated directories 11 and 13 (shown in greater detail in FIG. 3 (3.1 and 3.2) for the instruction and data caches 10 and 12 respectively are indicated as being (functionally) attached to the caches. It should be understood that they abrasively are not involved in the cache data flow paths, but that they are closely related physically to the operation of the caches. As will be explained more fully subsequently, for a given cache access the same line determined for the D field of the address causes the same line of both cache subsets and the associated directory entry to be accessed in parallel. Further this access causes data for both cache subsets A and B to be made available to the system.

The directories would normally be built as a separate extremely fast memories in an appropriate high speed circuit family such as emitter coupled logic. In the disclosed embodiment the directories had an access time of approximately 12 n secs compared with an access time of 30 n secs for the cache. This is to allow the logic decisions which must be made based on the directory entry to be ready when the two subsets of data from the cache are available.

As stated previously, the data cache may be loaded from either the main store 14 or the CPU 30. In the event that a line of data is to be stored from the main store 14 the data flow is through the fetch latch 20, which serves both caches and then through the byte input multiplexor 48 for the data cache and then into the data cache 12 itself. If a line of data is to be transferred from the CPU 30 the data path proceeds through the byte input multiplexor 48 and thence into the data cache 12 as indicated in the figure. In order to transfer data from the data cache 12 to the CPU, data passes through the output multiplexor 32, bypass multiplexor 34 into the CPU data registers.

In the event of a data cache miss, assuming that the line is both valid and indicates a modification (thus regaining a store back) this line of data in the data cache must be stored back to the memory 14 before a new line of data can be loaded into the specified line of the data cache. In order to do this, store back latch/multiplexor 52 would be energized.

The byte selects 49 and byte write gates 50 control the storage of data into the data cache.

On a CPU load op with a directory MISS, the byte selects 49 gate only the doublewords of main store data through the byte input multiplexor 48 and all byte write gates 50 are activated.

On a CPU store op with a directory HIT, the byte selects 49 gate only CPU data words through the byte input multiplexor 48 and the write gates 50 are used to control the number of bytes to be stored in the subset of the data cache. The CPU architecture allows for the store of one, two or three bytes of data.

On a CPU store op with a directory MISS, the byte selects 49 cause one, two or three bytes of CPU data to be merged into the first miss doubleword from the main store and passed through the byte input multiplexor 48. All four byte write gates 50 are activated. For the remaining three doublewords of the missed line, the byte selects 49 allows only the main store doublewords to pass through the byte input multiplexor 48.

It will be noted that both caches have a bypass mechanism wherein upon a fetch request to either of the caches which causes a cache miss, when the data becomes available from the main store it may be sent concurrently to the cache and to the CPU via the word select multiplexors 38 or 40 for the instruction and data caches, respectively. In this way the CPU need not be held up while waiting for the data (or instruction) to first be completely stored in the caches.

As will be described more fully subsequently only the target word of the instruction or data line is bypassed directly to the CPU.

It may thus be seen that the overall architecture of the present split cache subsystem is essentially conventional in nature. Thus, data paths are provided for loading both the instruction and data cache from the main store. Additional means load the data cache from the CPU. Similarly, both caches may transfer instructions and data respectively to the CPU and the data cache must also be able to store data back into the main store. Finally, a bypass mechanism is provided for both caches whereby the addressed word in a line is immediately sent to the CPU while the line is being concurrently stored in the cache to minimize CPU delay. Thus, it will be appreciated that the actual hardware configuration of the present split cache subsystem is quite straightforward in nature. It is the actual use of the cache and the unique organization of the cache directory and special control bits provided therein which result in the enhanced functions of the herein disclosed cache subsystem.

Returning briefly to FIG. 2, it will be noted that both of the caches are broken into two subsections A and B by separate line select mechanisms as shown. This will be appreciated more fully from the subsequent description. The present cache subsystem is two-way set associative. Any time a given line in the cache directory is addressed, one word from each of two lines of data are actually addressed within the cache belonging to two different pages (A and B). The line finally selected will be determined by a comparison of the target page address Pt with the two page references PA and PB contained in the cache directory, as will be explained subsequently. The addressed word from the selected line is gated by output multiplexors 16 or 32 to the CPU.

It will also be noted in referring to FIG. 2 that the various multibit cables connecting the units of the cache subsystem are shown as containing 32 or 36 bits. The difference between the 32 and 36 bit cables is that within the present embodiment, a 36 bit cable includes 32 data bits and 4 parity bits. In general, the 4 parity bits are stripped off or deleted when transferring data (or instructions) from the cache subsystem to the CPU. It will also be noted that the cable between main store 14 and fetch latch 20 contains 72 bits. As will be appreciated, this cable merely contains two 36 bit words, as the main store is organized to read out and transfer doublewords.

This completes the general description of the overall split cache subsystem hardware. It is believed that the general organization and operation of this hardware is completely straightforward and well known in the art.

Referring again to FIG. 3 (3.1 and 3.2), a detailed functional block diagram of a 16K byte data cache directory and its associated logic and control circuitry is shown. In the herein disclosed embodiment a 24 bit CPU address is assumed which is placed in register 60. Of this overall 24 bit address the 11 leftmost bits (Pt) comprises the page address of the memory reference. The D field consisting of 8 bits comprises the line address of the particular memory reference within the designated page. It is noted that this address is utilized to actually address one of the 256 lines in the cache directory (and also within the cache itself). Finally the rightmost 5 bits comprising the W field is the word or byte offset in an overall line of 32 bytes which address, segment as will be understood, is actually utilized to address the desired byte pointed to by the overall address.

As clearly shown in the FIGURE the cache directory contains 256 entries, (0–255) each of which entries comprise a total of seven information fields PA, PB, VA, VB, MA, MB, and LRU. As will be explained more fully subsequently PA, VA, and MA refer to a respective line within the cache belonging to subset A while the elements PB, VB and MB relate to subset B. The LRU bit indicates which of the two subset lines was most recently accessed and thus controls the replacement of a particular line (in either subset A or B) within the cache.

In operation, when a cache access is to be made, a particular line pointed to by the D field in the CPU address causes one of the 256 entries within the directory to be accessed. Next it must be determined if either of the pages PA, or PB matches the taget page address Pt in the CPU address. This comparison is effected in the two compare circuits 62 and 64. If either of the page addresses PA or PB match Pt, the "hit=A" or "hit=B" lines will be activated. Next, the appropriate validity and modified bits V. M are interrogated to see if the access will be permitted to continue. The details of this operation will also be set forth more completely subsequently. In the event neither of the two page addresses PA or PB compare with Pt, NAND circuit 66 will cause the "miss" line to be activated and the directory update logic 68 will indicate to the system that a "miss" has occurred and that a new line of data must be brought into the cache system. Which of the two subset lines will be replaced will be determined by the LRU bit. The seven (7) bit line indicated as "write strobes" as will be understood, allow new data to be entered into selected fields or bit positions of a particular entry of the cache directory as will be more clearly explained subsequently. Just which bits will be altered and when a new page address will be inserted into the PA or PB fields is of course determined by the particular instruction being decoded by CPU instruction decode mechanism 70.

The operation and organization of the cache directory and its associated controls is believed to be very straightforward and would be readily susceptible of implementation by persons skilled in the computer arts provided with the herein disclosed functional description and block diagrams.

FIG. 4 comprises a series of tables illustrating the cache subsystem addressing and structure. In addition the FIGURE illustrates the effect of the size of the cache subsystem on various parameters such as addressing fields etc. In essence, three different cache sizes are hypothesized 4K, 8K and 16K, it will be noted that the directory entry contains two page identifiers Pa and Pb as well as the five special control bits Va, Vb, Ma, Mb, and LRU. The specific way in which these particular control bits are utilized will be explained in detail subsequently.

The addressing of the directory in the cache is also clearly shown in the upper part of the FIGURE wherein the 24 bit CPU target address comprises the three fields P (page), D (line) and W (byte) fields. As is apparent from the diagram the cache itself is addressed using the D and W fields whereas the directory is addressed utilizing only the D field with such a two-way set associative cache. As will be understood by those skilled in the art, the directory is accessed and it is then determined if the P field of the target address matches either of the directory entries Pa or Pb. This FIGURE will also be described in further detail subsequently.

FIGS. 5–11 each constitute a synopsis in tabular form of the operations which occur within the hardware of the cache subsystem as a result of the specified hardware operations. The expression 'hardware procedure' is intended to mean a listing of the things which occur in the system as a consequence of the operation of the cache subsystem hardware.

Figure 5:
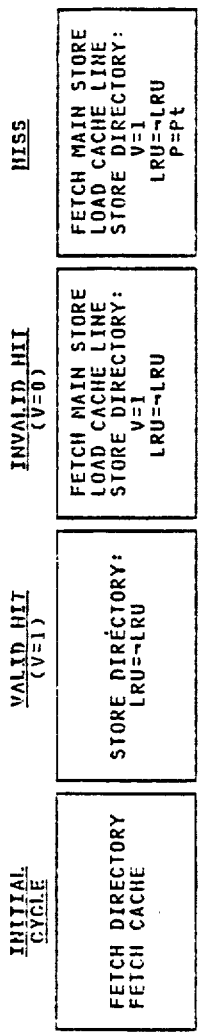
FIG. 5 is a tabular synopsis of the operations which occur in the cache subsystem during the operation of the Instruction Cache Fetch Hardware.
Figure 6:
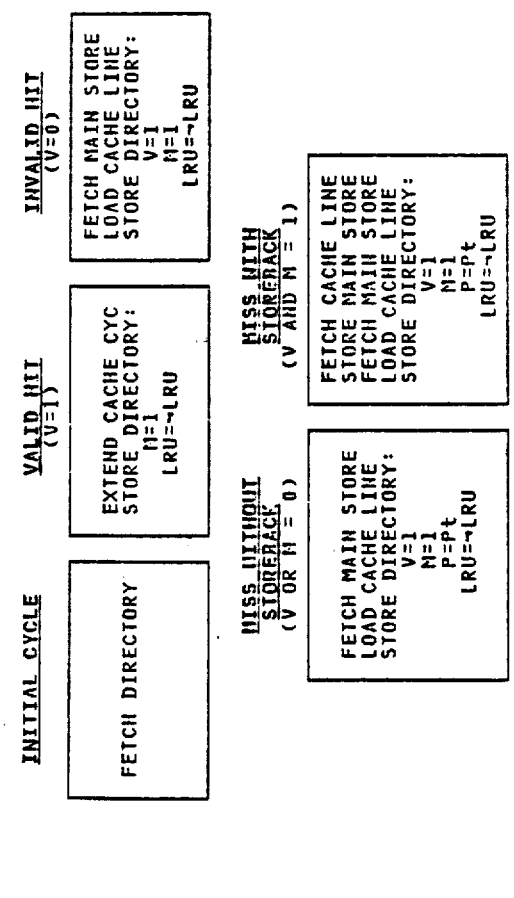
FIG. 6 is a tabular synopsis of the operations which occur in the cache subsystem during the operation of the Data Cache Fetch Hardware.

FIGS. 12–18 are all flow charts and are closely related to the various cache subsystem operations set forth in FIGS. 5–11 as indicated by the labels accompanying each of these FIGURES. In other words there is a flow chart for each of the enumerated hardware procedures for example, the data cache fetch hardware procedure of FIG. 6 is shown in much greater detail in FIG. 14. Thus in these flow charts the detailed testing and branching operations are clearly set forth as well as the particular operations which occur in the various enumerated blocks as one proceeds along the various branches. These operations are described in greater detail subsequently, however they are believed to be essentially self-explanatory of the operation of the cache subsystem.

The events which occur in such a cache subsystem, as well as the function and the purpose of all of the hardware components specifically shown in FIGS. 2 and 3 is believed to be well known in the art. A person skilled in the art utilizing the overall cache subsystem organization as set forth in FIGS. 2 and 3 and the detailed flow charts would have no difficultly building the cache subsystem of the present invention.

Detailed Description of the Operation of the Storage Hierarchy

The following description applies to a version of a minicomputer in which the hierarchical memory of the present invention has particular utility. It provides 24-bit addressing into said hierarchical storage system which contains up to 16 megabytes of real main storage. The 24-bit host CPU architecture is not critical to the present invention other than that it must supply the proper memory instructions which are set forth in detail herein.

The disclosed embodiment of the Storage Hierarchy consists of a Cache Subsystem containing dual 16K high speed bipolar caches operating at the CPU speed and an FET Main Store of 16 megabytes maximum, operating at one fifth the CPU speed.

The CPU communicates directly with the Cache Subsystem which, in turn, communicates with the Main Store (see FIG. 1). I/O data can be directed to the Main Store via a direct memory adapter (DMA), but can not be communicated directly to the Cache Subsystem.

The unit of data transfer between the CPU and the Cache Subsystem is a 4 byte word. The unit of transfer between the Main Store and the Cache Subsystem is a 32 byte line. Line transfers take place via four 8 byte doublewords from the Main Store or via eight 4 byte words to the Main Store (see FIG. 1). I/O data transfers to/from the Main Store are via 4 byte words under control of the DMA adapter.

Note that one parity bit per data byte is carried throughout the storage hierarchy. Parity bits are not transmitted to or received from the CPU.

CACHE MANAGEMENT

The herein disclosed hierarchical memory subsystem assumes an underlying system architecture designed to minimize CPU idle time caused by references to the Storage Hierarchy. Since the memory architecture is designed for use with a CPU that can utilize a new instruction every cycle, the use of a separate Instruction Cache matched to the CPU speed allows instruction fetches to proceed independently of data fetches in the Storage Hierarchy. Also, the architecture prohibits I/O communication directly with the Cache Subsystem and therefore precludes the possibility of a CPU lockout due to I/O interference. Similarly, to avoid performance degradation due to excessive references to the Main Store, all stores are directed to the Data Cache and are not automatically "stored through" to the Main Store.

Because of this type of architecture, modifications to the contents of the Main Store by I/O operations may not be immediately known to the CPU and modifications performed by the CPU to the contents of the Data Cache may not be immediately known to the I/O or the Instruction Cache.

However, the host system architecture provides for a limited set of cache management instructions that allow programs to control the relationship between the contents of Main Store and the Cache Subsystem. These management instructions deal with the cache lines of 32 bytes only and enable the system to avoid unnecessary cache references to the slower Main Store. For example, when a temporary storage area is no longer needed, use of the instruction INVALIDATE DATA CACHE LINE will prevent unnecessary storebacks to the Main Store, even if the line in the cache had been modified by a prior CPU store.

THE CACHE SUBSYSTEM

The Cache Subsystem consists of a 16K Instruction Cache and a 16K Data Cache. Each cache is organized as two-way set associative. Hence, each cache consists of an 8K subset A and an 8K subset B. One cache can contain a maximum of 512 lines of 32 bytes: 256 lines in subset A and 256 lines in subset B.

The Directory

Each cache has an associated directory. The directory is contained in a very high speed bipolar random access memory that has an access time of about one fifth the total cache cycle time.

Each entry in the directory described the existence and the status of two possible cache lines, one in each associative subset. The directory must therefore be large enough to contain as many entries as the maximum number of lines that can physically exist in one cache subset. Since each cache subset can contain up to 256 lines, the directory must contain 256 entries. This configuration is clearly shown in FIG. 2.1.

Address Fields

For purposes of the present embodiment, it is assumed that the host system utilizes a 24-bit address. Conceptually, the address can be subdivided into three fields: a page address, the address of a line in the page and the address of a byte in the line. These subfields are referred to herein as P, D and W, respectively. This organization is set forth in detail in FIG. 3. The table of FIG. 3 also gives a range of cache sizes (4K→16K) and the effect size has on the various parameters in the cache and the directory.

Each directory entry has two address fields containing the page addresses of the lines stored in the two cache subsets (Pa and Pb) and a control bit field that directs the hardware algorithm for the cache instruction being processed. The directory is addressed by the line address subfield of the target address. Note, that if the size of the cache is reduced, the size of the line address subfield decreases while the size of the page address subfield increases (see the table in FIG. 3). In effect, this creates a larger number of pages of smaller size (fewer lines per page).

Control Bit Fields

The Instruction Cache directory contains three control bits for each entry and the Data Cache directory contains five. Each entry of both cache directories contains two VALID bits (Va and Vb), one for each of the two subsets and a LEAST RECENTLY USED bit (LRU). Additionally, the Data Cache directory contains two MODIFIED bits (Ma and Mb), one for each of the two subsets (see FIG. 3).

The VALID bits are used to control the relationship between the contents of the cache and Main Store. They are set to "one" whenever the line in the cache has been replaced by the version currently residing in the Main Store. The VALID bit for a line can be turned off by a cache management instruction from the processor. Any references by the program to a line that has been invalidated (V=0) forces the invalid line to be replaced by its current version existing in the Main Store.

The LRU bit determines which subset will receive a replacement line from the Main Store. The state of the LRU bit is controlled by the cache hardware procedure and cannot be managed by the processor under program control. The least recently used replacement procedure is based on the premise that an efficient strategy to follow, when it becomes necessary to replace a line in the cache by a new line from the Main Store, is to replace the line in the least recently used associative set. Since the caches are just two-way set associative, a single control bit can be used to make this decision and "least" recently used reduces to "last" recently used.

The MODIFIED bits in the Data Cache directory are set to "one" whenever a processor STORE instruction takes place. This indicates to the cache control hardware that the version of the line in the cache has been updated and must be stored back into the Main Store whenever this line has to be replaced. However, Storeback will be inhibited if the line has been invalidated (V=0). It will again be noted that there is no store back possible in the instruction cache.

Prototype Implementation

The storage hierarchy described above has been implemented in a prototype. The Main Store was designed using 1.0 megabytes of FET storage with a 300 nanosecond cycle time. The dual caches were each designed using 16K bytes of bipolar storage with a 60 nanosecond cycle time, matching the CPU cycle time. Each cache contains 256 lines in each of two associative sets or a maximum of 512 lines. Furthermore, each cache can be manually reduced in maximum size to either 8K or 4K bytes, thereby reducing the total contents to 256 lines or 128 lines, respectively (see the table in FIG. 3).

Physical Package

The cache arrays for both the Instruction and Data caches were packages on eight cards utilizing bipolar transistor storage technology. Each card contains 2K×18 bits and there were four cards per cache. The herein described embodiment of the prototype is for illustrative purposes only. The general construction of such a cache is believed to be well known to those skilled in the art following the architectural definitions, control functions and instruction formats described herein.

Cache Organization

The cache interface to the CPU is 32 bits (one word) wide and the interface to the Main Store is 72 bits (a doubleword with parity) wide for fetches or 36 bits for stores. For an initial fetch, it is desirable to be able to access both the A and B subsets simultaneously, at the target address. Various cache memory organizations are possible, provided that a word at the target address can be read from both associative subsets simultaneously.

This is done because the subset in which the target resides is not knwon until later in the cache cycle, when the directory access provides that information. Because of this reason and to save time, the directory and the cache are accessed simultaneously.

If the directory access indicates that the target does not exist in either the A or B subset (MISS), then the data from the cache access is ignored and the Main Store is accessed for the line containing the target data. A data cache miss may also require a storeback of the line currently residing in the cache, prior to its replacement by a new line from the main store.

If the target page address matches the directory entry for either the A or B subsets (HIT), the correct subset is immediately known and the target data from the cache can be gated directly from the hit subset to the CPU. Using this strategy minimizes the total time required to provide data to the CPU.

Main store accesses due to cache misses produce a line of 32 bytes which line is multiplexed to the cache as a sequential series of four doublewords. The storage system architecture specifies that, on any cache miss, the doubleword containing the target word is the first to be returned by the storage control. The remaining three doublewords are returned from the sequentially adjacent addresses produced by incrementing the target address by doublewords until all four doublewords contained in the line have been returned.

In the Data Cache, a store MISS is handled by merging the CPU data into the first double word from the Main Store, since this first double word will always contain the target word.

INSTRUCTION CACHE FETCH

Figure 13:
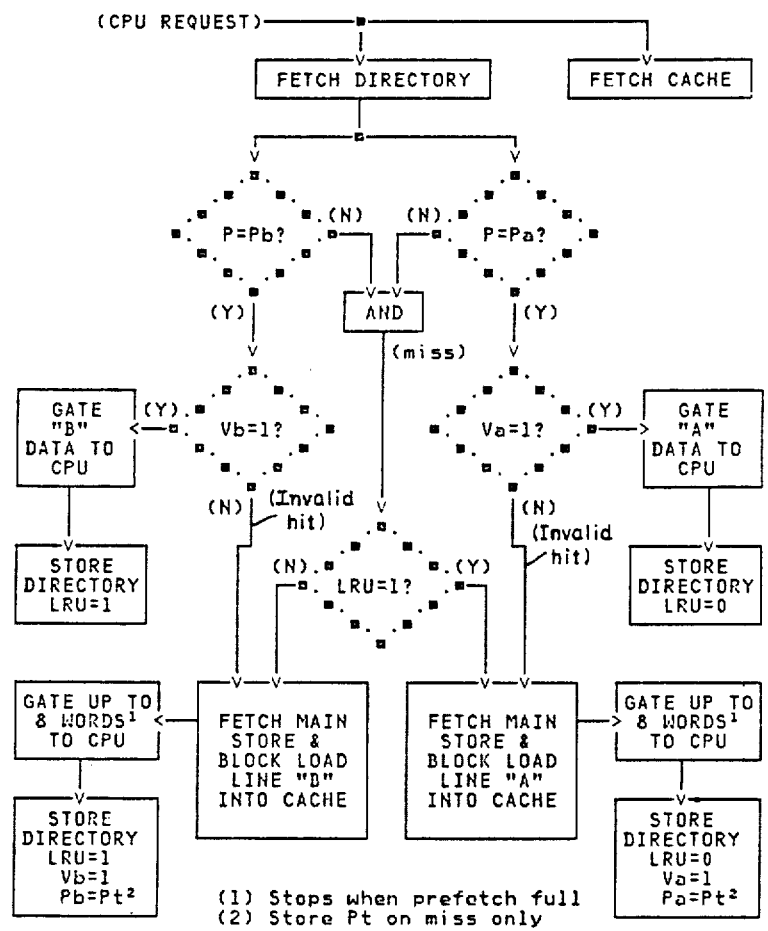
FIG. 13 comprises a detailed flow diagram of the operations occur in the cache subsystem hardware during the performance of the "Instruction Cache Fetch" Instruction.

The flow chart of the Instruction Cache Fetch hardware operational sequence is illustrated in FIG. 13 and is summarized in tabular form FIG. 5. A block diagram of the data flow for both caches is illustrated in FIG. 2.1.

An Instruction Cache Fetch request initiates an access of the cache array and the directory. The directory access is overlapped with the cache access. Both caches are organized so that the target word of a fetch will be accessed from both the A and the B subsets simultaneously. This is done without knowing in which particular subset the target data may reside, or even if the target exist at all, in either subset.

HIT

When the target address matches the directory entry for either the A or B subset, the directory access results in a HIT. The correct subset is immediately known and, if the line is valid, the target data can merely be gated from the hit subset to the CPU. No additional time penalty contain a prefetch stack four levels deep, which is constantly sending fetch requests to the instruction Cache in an attempt to keep itself filled, thus providing a new instruction each machine cycle in accordance with the requirements of the overall CPU architecture. In the case of an Instruction Cache MISS, more than one of these prefetch levels may be empty. The cache will continue to bypass data to the CPU as the new line arrives from the Main Store, until the end of the cache line is reached or until the CPU prefetch mechanism becomes full and halts the bypass action. The number of words by-passed to the CPU in this fasion can be anywhere from a minimum of one word to a maximum of all 8 words in the line.

Directory Update

After a MISS, the directory is updated with the new target address (Pt), the VALID bit for the subset into which the new line was stored is set to "one" and the LRU bit is switched to the opposite subset.

If the target address is matched by a directory entry that is invalid (V=0), the result is an INVALID HIT and the hardware action is the same as if a MISS had occurred, with two exceptions. First, the new line would go into the matched subset, regardless of the state of the LRU bit and second, the address in the directory would not be updated. This is because the address produced a valid match but the data is invalid and must be replaced. Following the load of the new line, the directory LRU bit is switched to the opposite subset and the VALID bit for the stored subset is set on (to a "1"). It should be noted again that the only way the "VALID" bit ($V_a$ or $V_b$) can be "zero" is via the CPU, using an "Invalidate Instruction Cache Line" instruction.

FIG. 5 summarizes the just described Instruction Cache Fetch hardware operational sequence.

DATA CACHE FETCH

Figure 14:
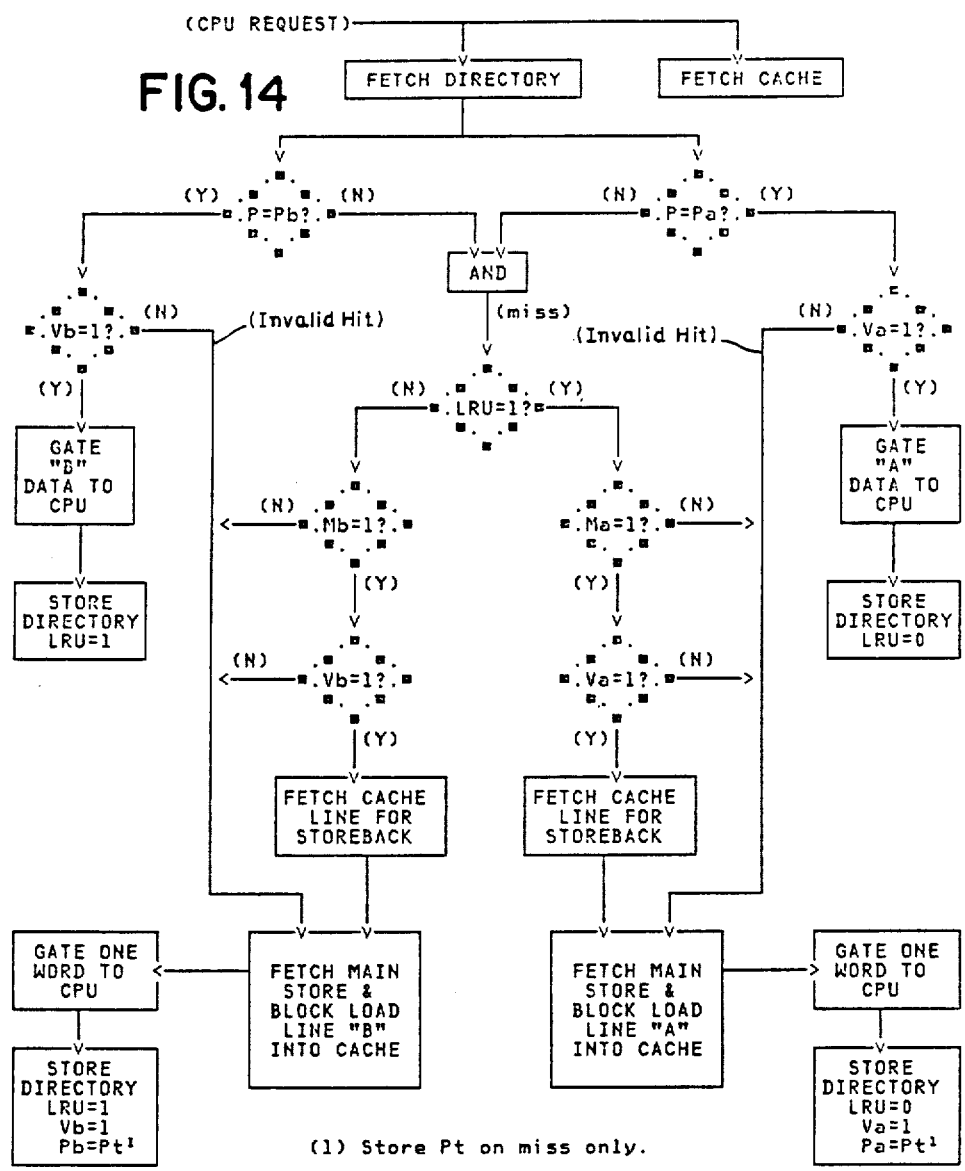
FIG. 14 comprises a detailed flow diagram of thea operations occur in the cache subsystem hardware during the performance of the "Data Cache Fetch" Instruction.

The flow chart for the Data Cache Fetch hardware operational sequence is illustrated in FIG. 14 and is summarized in FIG. 6. The overall data flow diagram can be seen in FIG. 2.1

HIT

The Data Cache Fetch procedure for a valid hit is identical to the Instruction Cache Fetch procedure, described above and need not be repeated.

MISS or Invalid HIT

The Data Cache Fetch operational sequence for a MISS or an INVALID HIT is similar to the Instruction Cache Fetch sequence described above, with two exceptions.

First, on a MISS, valid lines that have been modified by CPU stores must be stored back into the Main Store before they are replaced. Second, unlike the Instruction Cache which, on a MISS, can bypass up to 8 words to the CPU prefetch stack, the Data Cache bypasses only one word to the CPU on a MISS.

When a fetch MISS occurs, a check is made on the MODIFIED and VALID bits for the line to be replaced. Which subset, A or B is to be replaced is determined by the LRU bit. If the line is invalid or if it has not been modified, no storeback takes place and a fetch request for the target line is sent to the Main Store. The first double word of the line returned by the Main Store will contain the target word and the cache hardware strips out this word and bypasses it directly to the CPU, at the same time that the first double word is being stored in the cache. Following the store of the new line, the directory is updated as described for Instruction Cache Fetch.

Storeback

If the line to be replaced is both VALID and MODIFIED, it must be stored back into the Main Store before a fetch request is issued for the replacement line. The page address of the line to be stored back is contained in the directory entry and this is the address supplied to the Main Store for the storeback. The cache takes four cycles to read out the four double words of the storeback line and a multiplexer 52 separates these into a series of eight words for transmission to the Storage Input Register (SIR) of the Main Store (see FIG. 2.1).

Ordinarily, it would be possible for the I/O to gain access to the Main Store between a storeback and the issuance of the fetch request for the new line, thereby holding up the Data Cache during the I/O operation. To prevent this from happening, a special high priority fetch request can be issued by the Data Cache to the Main Store, specifically for the case of a Data Cache MISS with storeback. The effect of this high priority request is to force the Main Store to initiate an automatic fetch of the new line, while loading the old (storeback) line into the SIR. This produces back-to-back Main Store cycles dedicated to the Data Cache and allows the Main Store fetch for the new line to take place before the store of the old line, which is temporarily saved in the SIR.

To implement this strategy, the Data Cache is accessed for the first doubleword of the line to be stored back and the Data Cache control sends the Main Store the storeback address, the first storeback word and the high priority request. As soon as the Main Store acknowledges receipt of the request, the Data Cache begins fetching the remaining three double words of the old line and changes the address to the Main Store from the old (storeback) address to the new (target) address. The storeback line is transmitted to the Main Store SIR one word at a time. When the Main Store returns the new line data, a series of four double word stores is initiated in the Data Cache and the target data is bypassed to the CPU, while the new line is being stored. The directory information is then updated.

FIG. 6 as stated previously summarizes the Data Cache Fetch hardware operational sequence and FIG. 14 specifies the sequential details of the operation in flow chart form.

DATA CACHE STORE

Figure 7:
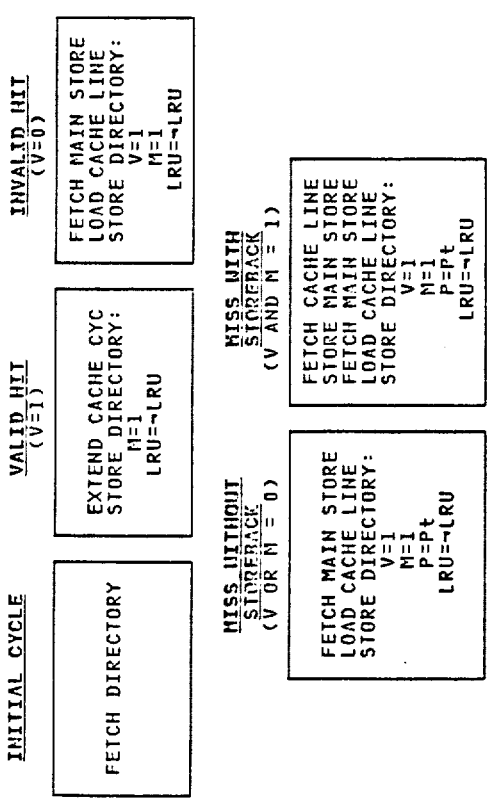
FIG. 7 is a tabular synopsis of the operations which occur in the cache subsystem during the operation of the Data Cache Store Hardware.
Figure 15:
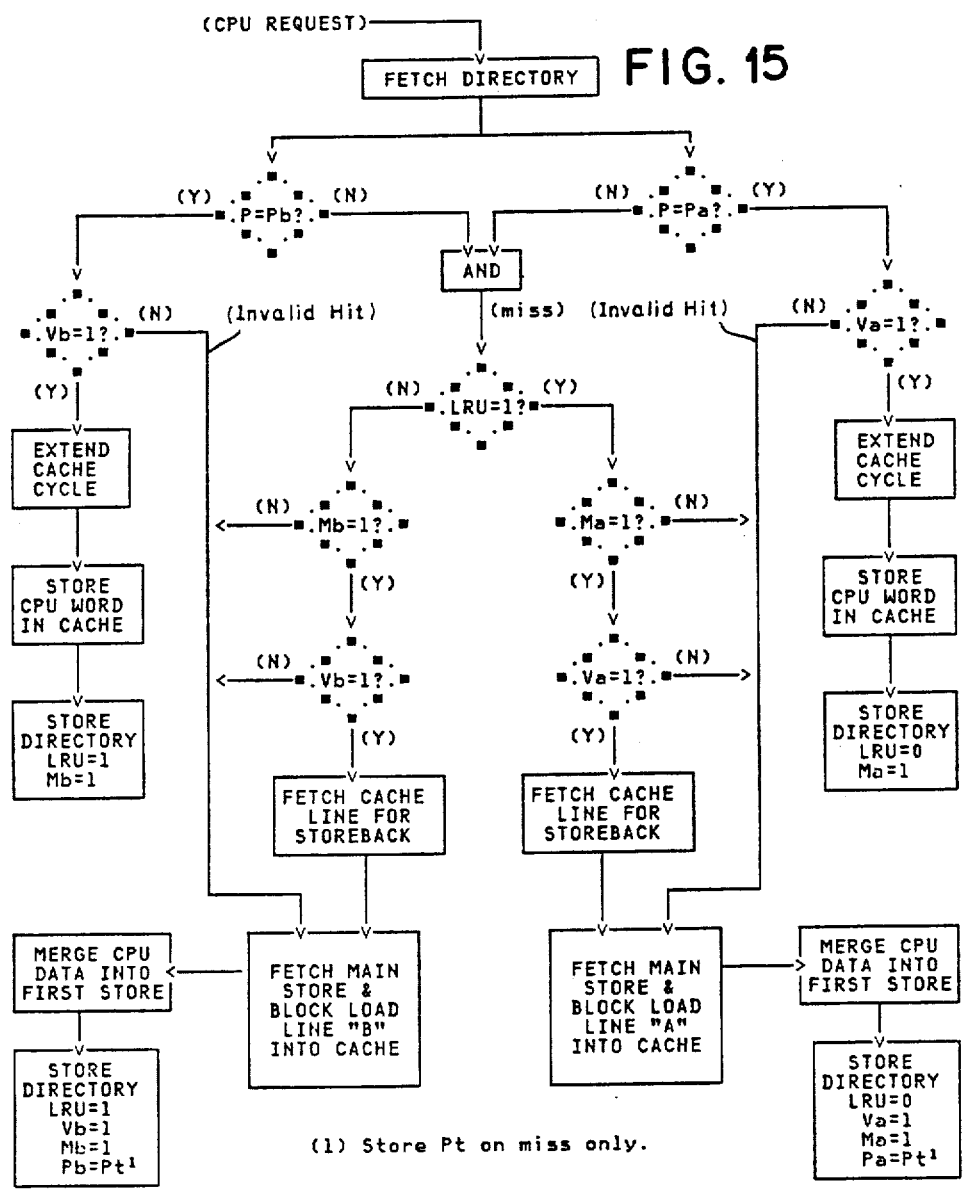
FIG. 15 comprises a detailed flow diagram of the operations occur in the cache subsystem hardware during the performance of the "Data Cache Store" Instruction.

The flow chart for the Data Cache Store hardware operation sequence is illustrated in FIG. 15 and is summarized in FIG. 7. For the data flow diagram, reference should again be made to FIG. 2.1. A brief comparison of the flow charts in FIG. 14 and FIG. 15 reveals that the Data Cache fetch and store algorithm are quite similar. The primary difference is simple the direction of data flow between the CPU and the cache. The following discussion of the store process assumes familiarity with the fetch process and highlights the differences between the two.

Unlike a fetch request, a store request to the Data Cache does not automatically initiate an access of the cache array. Both subsets of the cache array can be read simultaneously for a fetch operation, but only one subset can be written for a store operation. Therefore, a store operation can not be initiated until the results of the directory access indicate whether the target exists in the cache and, if so, in which subset it resides. Since the cache array access cannot be overlapped with the directory access, as in a fetch operation, all store operations require an extended cache cycle. The store cycle must be extended by fifty percent (50%) to accommodate the required sequential accessing of the directory and the cache array.

Storage is organized as a sequence of 32-bit words. Each word can be subdivided into two 16-bit halfwords or four 8-bit characters. Processor store instruction operate on entities of either one, two or three characters. These three types of processor stores are differentiated by the cache hardware as three distinct store commands: STORE 8 (1 byte), STORE 16 (2 bytes) and STORE 24 (3 bytes). The flow chart for Data Cache Store in FIG. 14 applies to all three store commands. The CPU always supplies a 32 bit data word with each store command and prealigns the byte(s) to be written, within the word. The two least significant bits of the store target address plus the specific type of store command provides the Data Cache control hardware with sufficient information to determine which of the four byte write gates (50 in FIG. 21.) ($W_0$-$W_3$) to activate.

HIT

If the store target address exists in the directory, the subset to be written is identified and the cache cycle is extended to accommodate the store. The 32-bit store data word plus generated parity (4 bits) is applied simultaneously to all array cards. The intersection of the byte write gates with a subset selection determines which bytes are written. Following the store, the directory is updated by turning on the MODIFIED bit for the hit line and switching the LRU bit to the opposite subset.

MISS or Invalid HIT

If the store target line is invalid or is not in the cache, the cache cycle is not extended and the line must be retrieved from the Main Store. If the line to be replaced is both VALID and MODIFIED, a storeback is required and the storeback mechanism operates exactly as described for a Data Cache Fetch.

The Data Cache has an input byte multiplexer 48 (see FIG. 2.1) capable of inserting bytes anywhere within an 8 byte double word. On a MISS, the multiplexer is set up to merge the data from the CPU into the fetch data returned by the Main Store. Since the target of the store will be contained in the first double word of line data returned by the Main Store, the merge of CPU data takes place only on the first of four double word stores into the cache. The three subsequent double words and all bytes of the first double word not selected by the CPU are switched by the input multiplexer to the Main Store fetch data path. During the four double word stores, all byte write gates are turned on and one subset is selected. Hence, the bytes that will be modified by the store are controlled exclusively by the input multiplexer and subset selection.

Following a store MISS (or INVALID HIT), the directory is updated the same as for either an Instruction or Data Cache Fetch, except that the MODIFIED bit is turned on for the replacement line that received the store.

FIG. 7 summarizes the Data Cache Store hardware procedure.

INVALIDATE CACHE LINE

Figure 8:
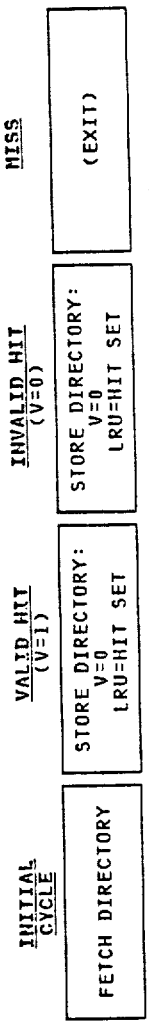
FIG. 8 is a tabular synopsis of the operations which occur in the cache subsystem hardware during the operation of the Invalidate Instruction or Data Cache Line.
Figure 12:
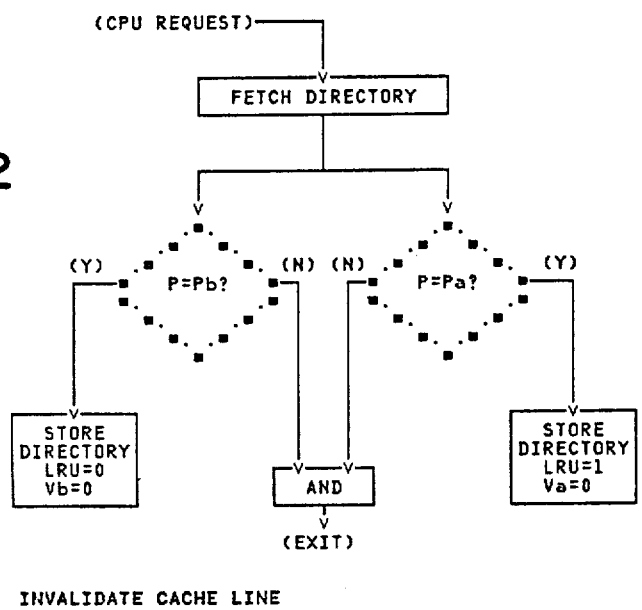
FIG. 12 comprises a detailed flow diagram of the operations which occur in the cache subsystem hardware during the performance of the "Invalidate Cache Line" Instruction.

The flowchart for the hardware invalidate operational sequence, which applies to either cache, can be seen in FIG. 12 and is summarized in FIG. 8.

The Instruction Cache control hardware (shown in FIGS. 2.1 and 2.2) is designed to respond to one cache management instruction from the processor. This instruction is called INVALIDATE INSTRUCTION CACHE LINE (INICL) and its purpose is to set the VALID bit in the directory to zero for the line identified by the target address. If an instruction is modified in the main store, the line must be invalidated to force the cache to access tha main store for the updated information. The Data Cache responds in an identical way to the INVALIDATE DATA CACHE LINE (INDCL) cache management instruction. The cache arrays are not accessed, since only the directory is involved with this management instruction.

It should be noted that the target address will identify a single line only, which may exist in cache subset A or B, but not both. Hence, only one of the two VALID bits in the directory entry for the target address will be affected. Thus only $V_a$ or $V_b$ will be affected.

The invalidate instruction allows the program to force the replacement of a line in the cache with its most recent version from the Main Store. The LRU bit will be forced by the hardware to point to the subset containing the invalidated line, so the replacement line will go into the same cache location.

MISS

It is possible that the page address subfield of the target does not exist in the directory for either cache subset A or B. This is defined as a cache MISS, which must be handled by the hardware procedure. In the case of either (data or instruction) invalidate cache line instruction, a MISS obviates the need for modifying any VALID bits and the hardware simply does nothing.

FIG. 8 summarizes the INICL and INDCL hardware operational sequences.

LOAD DATA CACHE LINE

Figure 9:
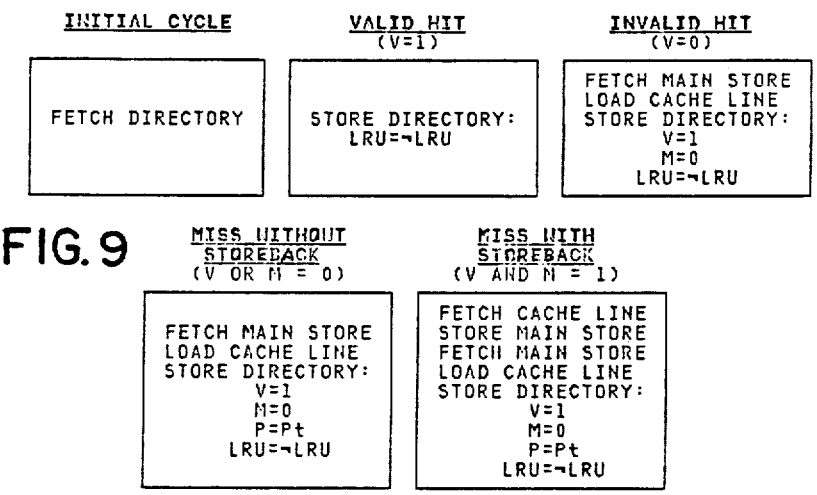
FIG. 9 is a tabular synopsis of the operations which occur in the cache subsystem hardware during the operation of the Load Data Cache Line.
Figure 16:
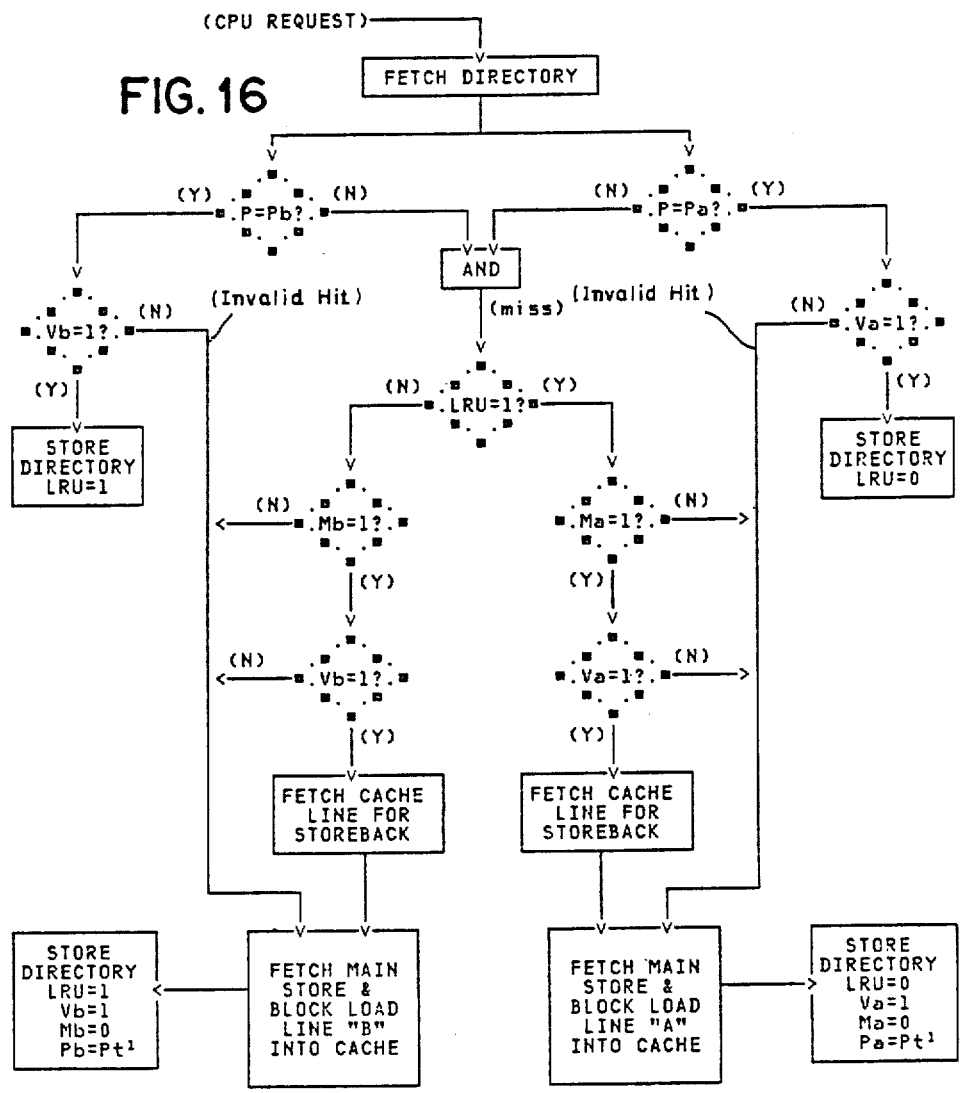
FIG. 16 comprises a detailed flow diagram of the operations which occur in the cache subsystem hardware during the performance of the "Load Data Cache Line" Instruction.

The flow chart for the Load Data Cache line (LDCL) cache management instruction can be seen in FIG. 16 and is summarized in FIG. 9. The purpose of this instruction is solely to load a line into the cache from the Main Store, if it is not already in the cache. No data is bypassed to the CPU during the load.

HIT

If the line is already in the cache and is valid, no load takes place and the directory LRU bit is switched to the opposite subset.

MISS or Invalid HIT

On a MISS or an INVALID HIT, this instruction behaves as described above for a Data Cache Fetch. A fetch request for the missing line is transmitted to the Main Store. If there was a MISS and the line to be replaced is both VALID and MODIFIED, a storeback takes place first. The line returned from the Main Store is loaded into the cache but no data is bypassed to the CPU. Following the load of the new line, the VALID bit for the stored subset is set "on", (i.e. to "1") the MODIFIED bit is set "off" (i.e. to a "0") and the LRU bit is switched to the opposite subset. If the new line was loaded due to a MISS, the directory is also updated with the new line's page address.

FIG. 9 summrizes the Load Data Cache Line hardware procedure.

SET DATA CACHE LINE

Figure 10:
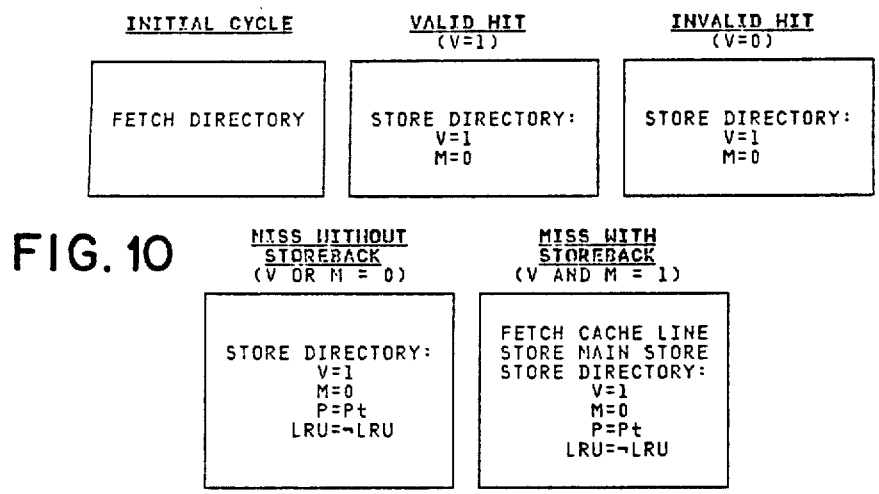
FIG. 10 is a tabular synopsis of the operations whihc occur in the cache subsystem hardware during the operation of the Set Data Cache Line.
Figure 17:
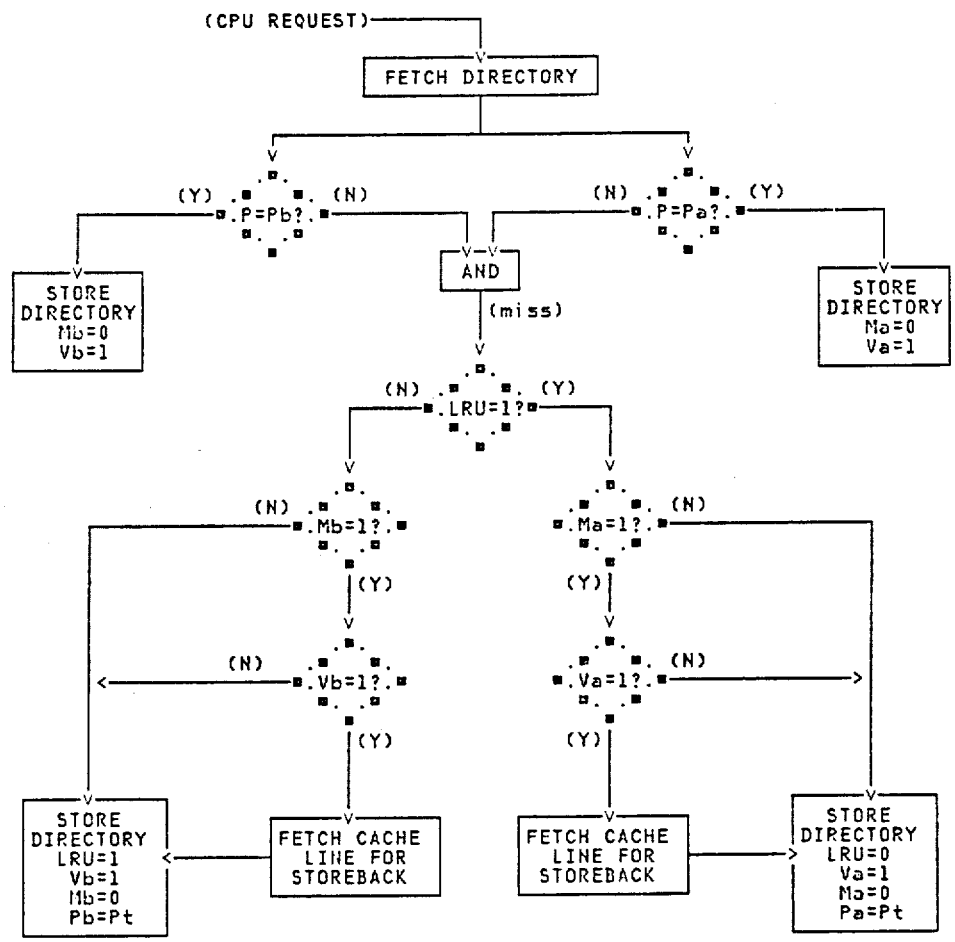
FIG. 17 comprises a detailed flow diagram of the operations which occur in the cache subsystem hardware during the performance of the "Set Data Cache Line" Instruction.

The flow chart for the Set Data Cache Line (SETDCL) cache management instruction can be seen in FIG. 17 and is summarized in FIG. 10. The purpose of this instruction is to establish a directory entry for the line, if it is not already there, but not to load the line into the cache from the Main Store. It can be used to prevent unnecessary fetches from the Main Store when lines are to be modified by subsequent stores.

HIT

If the line already exists in the cache, its directory entry is updated by setting the VALID bit "on" and the MODIFIED bit "off".

MISS

On a MISS, if the currently resident line is both VALID and MODIFIED, this instruction will force a storeback. Following a MISS (with or without a storeback), the directory is updated with the new target page address, the VALID bit is set on, the MODIFIED bit is set off and the LRU bit is switched to the opposite subset. No data transfer takes place, unless a storeback is required.

FIG. 10 summarized the Set Data Cache Line hardware operational sequence.

STORE DATA CACHE LINE

Figure 11:
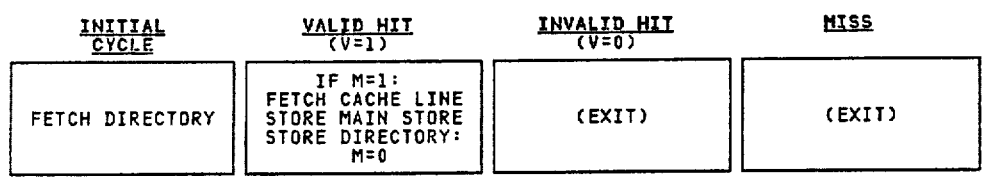
FIG. 11 is a tabular synopsis of the operations which occur in the cache subsystem hardware during the operation of the Store Data Cache Line.
Figure 18:
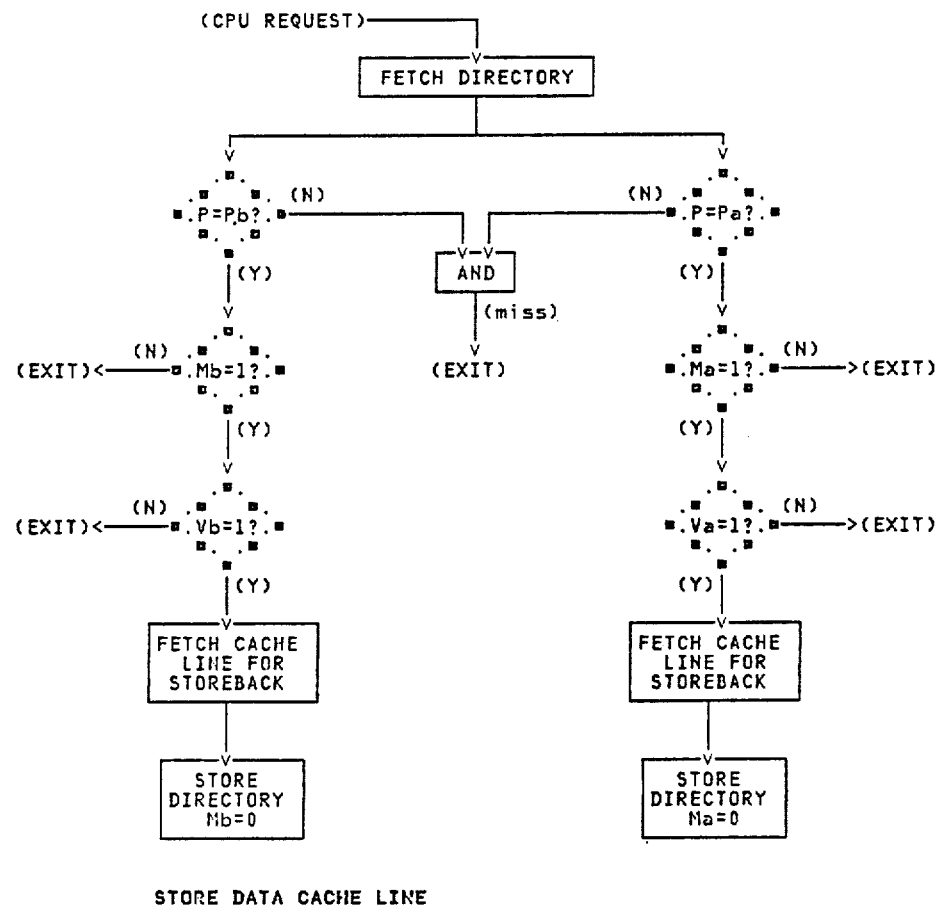
FIG. 18 comprises a detailed flow diagram of the operations which occur in the cache subsystem hardware during the performance of the "Store Data Cache Line" Instruction.

The flow chart for the Store Data Cache Line (STDCL) cache management instruction can be seen in detail in FIG. 18 and is summarized in FIG. 11. The purpose of this instruction is to force the storeback of a line that is both VALID and MODIFIED, so that the Main Store will reflect the latest version of the line. As will be apparent this storing of the Data Cache Line is not the result of a normal "fetch" or "store" operation.

HIT

IF the line is in the cache and is both VALID and MODIFIED, a storeback takes place and the directory is updated by turning the MODIFIED bit off. The line is still retained in the cache for future use.

MISS or Invalid HIT

If the line is not in the cache or, if it exists in the cache but is either not VALID or not MODIFIED, the hardware does not perform the storeback and the procedure is exited.

It shall be noted that this instruction may not complete in time for the line stored back to the Main Store to be available for subsequent I/O instructions or Instruction Cache misses. A special synchronized version of the instruction is available for this purpose and is described below.

FIG. 11 summarized the Store Data Cache Line hardware operational sequence.

STORE AND SYNCHRONIZE DATA CACHE LINE

This instruction (STSDCL) operates in the cache exactly as Store Data Cache Line (STDCL) described above. However, the processor waits until this instruction has completed before it proceeds in the instruction stream. Hence, any I/O or Instruction Cache activity that takes place after this instruction executes will have the newest version of the line available in the Main Store.

CONCLUSIONS

To synopsize, the herein disclosed cache subsystem architecture is unique because of its ability to minimize CPU idle time caused by references to storage. The novelty lies in the use of a number of specialized cache management instructions and several special control bits in the cache directory that can be used in a unique manner to minimize such references to the main store.

The cache management instructions and the directory control bits allow software to control the relationship between the contents of the cache subsystem and the contents of the main store. Because of this ability, the effective cache hit ratio has been improved thereby enabling the system to avoid unnecessary references to the slower main store.

Additionally, the architecture of the cache subsystem is novel because of its ability to improve the access time when references to the main store are unavoidable. This ability is derived from the unique use of separate caches for instructions and data that can access the main store independently and overlapped and by the use of a cache bypass mechanism to speed the flow of target information from the main store to the CPU.

The ability to allow instruction fetches to proceed independently of data fetches in the storage hierarchy, the prohibiting of automatic "store-through" from the CPU to the main store and the software use of special cache management instructions processed by the cache hardware all combine to improve system performance by allowing hardware and software functions to interact harmoniously in a novel way.

While the invention has been described with respect to the disclosed preferred embodiment, it will be readily appreciated by those skilled in the art that many changes in form and detail could be made without departing from the spirit and scope of the invention as set forth in the following claims.

Having thus described our invention, what we claim as new, and desire to secure by Letters Patent is:

1. A hierarchical memory system for use with a high speed data processing system including a CPU for performing sequences of operations in response to instructions supplied thereto, a large relatively slow main memory and a smaller high speed cache memory subsystem, said cache memory subsystem comprising;

two separately addressable sections dedicated for storing data and instructions respectively each said section having a directory including an addressable storage location therein for every line stored in its associated cache for accessing the desired cache directory utilizing the "line" field of a main memory address, each said storage location in both directories including means for storing the high order bits of said main memory address of the information stored in the respective cache line, means for comparing said high order bits in the accessed cache directory storage location with the high order bits of a requested address to determine if the information at the requested address in the associated cache is present, each said directory also containing at least one control bit associated with each line stored in the said cache accessible under system control selectively settable under program control or system control for indicating that the associated line of data stored in the cache is invalid and means for interrogating said bit for indicating that a main memory fetch must occur even though the requested address is present, and means for prohibiting a store back of any data stored in the instruction cache portion of said cache subsystem to the main storage at any time.

2. A hierarchical memory system and associated cache subsystem as set forth in claim 1, including means for accessing said data cache and instruction cache concurrently whereby an instruction and data fetch may occur substantially concurrently and means to allow only one of said caches to access main memory at a time when a cache "miss" occurs in both caches.

3. A hierarchical memory system and associated cache subsystem as set forth in claim 1, including at least one "modified" bit in said data cache directory associated with each line of main storage data stored therein selectively settable under program control for indicating that the particular cache line pointed to by a particular address stored in the address storage location of the directory has been modified by a previous CPU operation and means for storing the line of data currently in the cache back into main memory before the line can be replaced in the cache.

4. A hierarchical memory system and associated cache subsystem as set forth in claim 3 wherein said instruction cache is provided with a "write" data path from the main memory but not from the CPU whereby modification of an instruction cache line by the CPU is not possible.

5. A hierarchical memory system and associated cache subsystem as set forth in claim 4, wherein the means for setting said at least one control bit as a validity bit at a particular instruction cache directory address to "invalid" under program control includes means for determining that modification to an instruction must be made.

6. A hierarchical memory system and associated cache subsystem as set forth in claim 5, including means operable upon a determination that a particular requested line of information is not resident in the cache subsystem to cause a cache "miss" determination to be made, and means for fetching the requested information from main memory and for concurrently passing the requested unit for information directly to the CPU and to the cache subsystem for storage therein whereby the CPU is not required to wait while the information is first stored at the proper address in the cache subsystem.

7. A hierarchical memory system and associated cache subsystem as set forth in claim 5, including means associated with said data cache subsystem operable under program control for preventing the setting of said "modified" bits when data in the cache is modified by the CPU in those situations where it is not desired to retain the data in main memory.

8. A hierarchical memory system and associated cache subsystem as set forth in claim 7, wherein each of said caches is capable of storing up to two pages of main storage information (data and instruction) wherein each said cache and its associated directory is organized to be a two-way set associative whereby when a given line address is accessed in the directory and cache the specific line possibly belonging to two different pages ($P_a$ and $P_b$) is accessed, means for determining if the particular requested page address (Pt) is stored at the particular line address in the cache and, if not, initiating a line replacement procedure and means for writing a new line of data from the main memory into the specified line of the cache pointed to by a LRU bit in the directory for each line pair stored in the cache subsystem which assures that the least recently used of the two lines of information in the cache pointed to by the line address is replaced as a result of the replacement procedure.

9. A hierarchical memory system and associated cache subsystem as set forth in claim 8, including means for setting the LRU bit to point to the other member of the line pair in the event of either a cache "hit" for the particular line or when a particular new line of data is stored in the cache and forwarded to the CPU.

10. A hierarchical memory system and associated cache subsystem as set forth in claim 9, including means for writing new high order address bits corresponding to the page address of the line in main memory in the associated address storage location of the directory whenever a new line of data is written into one of the two subsets of the instruction or data cache and means for inhibiting the writing of said page address when a main memory access occurs as the result of an "invalid" hit.

11. A hierarchical memory system and associated cache subsystem as set forth in claim 10 wherein said cache directory is a separate entity with respect to its associated cache memory and has an access time significantly shorter than the access time of said cache.

12. A hierarchical memory system for use with a high speed data processing system including a CPU for performing sequences of operations in response to instructions applied thereto a large relatively slow main memory, a small high speed cache memory subsystem, and a smaller high speed cache directory having an access time substantially less than that of the cache memory, said cache memory subsystem comprising;
- two separately addressable sections dedicated to the storing of data and instructions respectively,
- each said section having a directory including an addressable storage location therein for every line stored in its associated cache,
- means for accessing the desired cache directory utilizing the "line" field of the memory address,
- each said storage location in both directions including means for storing the high order bits of the memory address which corresponds to the page address in memory of the information stored in the respective cache line,
- means for compring said high order bits stored in the accessed cache directory storage location with the high order bits of a requested address to determine if the information at the requested address in the associated cache is present,
- each said directory also containing at least one control bit settable under program control associated with each line stored in the said cache accessible under system control for indicating that the associated line of data stored in the cache is invalid, and
- means for interrogating said control bit for indicating that a new line of data or instruction must be accessed from main memory even though the requested address is present,
- at least one "modified" bit in said data cache directory settable under program control associated with each line of main storage data stored therein for indicating that the particular cache line pointed to by a particular address stored in the addressed storage location of the directory has been modified by a previous CPU operation and means for storing the line of data currently in the cache back into main memory before the line can be replaced in the cache.
- means for prohibiting the store back of any line stored in the instruction cache portion of said cache subsystem to the main storage,
- said instruction cache being provided with a "write" data path only from the main memory whereby modification of an instruction cache line by the CPU is not possible.

13. A hierarchical memory system and associated cache subsystem as set forth in claim 12 including means operable upon a determination that a particular requested line of information is not resident in the cache subsystem to cause a cache "miss" determination to be made, and means for accessing the requested information from main memory and for concurrently passing the requested unit of information directly to the CPU and to the cache subsystem for storage therein whereby the CPU is not required to wait while the information is first stored at the proper address in the cache subsystem.

14. A hierarchical memory system and associated cache subsystem as set forth in claim 13 including means associated with said data cache subsystem operable under program control for preventing the setting of said "modified" bit when data in the cache is modified by the CPU in those situations where it is not desired to retain the data in the main memory.

15. A hierarchical memory system and associated cache subsystem as set forth in claim 14 wherein each of said caches is capable of storing up to two pages of main storage information (data and instruction) wherein each said cache and its associated directory is organized to be two-way set associative whereby when a given line address is accessed in the directory and cache two specified lines resident in two different pages ($P_a$ and $P_b$) is accessed,
- means for determining if the particular requested page address (Pt) is stored at the particular line address in the cache and, if not, initiating a line replacement procedure,
- means for writing a new line of data from the main memory into the specified line of the cache pointed to by a LRU bit in the directory for each line pair stored in the cache subsystem which assures that the least recently used of the two lines of information in the cache pointed to by the line address is replaced as a result of the replacement procedure and,
- means for setting the LRU bit to point to the other member of the line pair in the event of either a cache "hit" for the particular line or when a particular new line of data is stored in the cache and forwarded to the CPU.

16. A hierarchical memory system and associated cache subsystem as set forth in claim 15 including means for writing new high order address bits, corresponding to a page address in main memory in the associated address storage location of the directory whenever a new line of data is written into one of the two subsets of the instruction or data cache and means for inhibiting the rewriting of said page address when a main memory access occurs as the result of an "invalid" hit.

* * * * *